US012800289B2

(12) United States Patent
Rodd-Routley

(10) Patent No.: US 12,800,289 B2
(45) Date of Patent: Nov. 17, 2026

(54) METHOD OF PROCESSING INTERFEROMETRY SIGNAL, AND ASSOCIATED INTERFEROMETER

(71) Applicant: Rapid Phenotyping Pty Limited, Hamilton (AU)

(72) Inventor: Selene Rodd-Routley, Newcastle (AU)

( * ) Notice: Subject to any disclaimer, the term of this patent is extended or adjusted under 35 U.S.C. 154(b) by 398 days.

(21) Appl. No.: 18/268,272

(22) PCT Filed: Dec. 17, 2021

(86) PCT No.: PCT/AU2021/051513
§ 371 (c)(1),
(2) Date: Jun. 19, 2023

(87) PCT Pub. No.: WO2022/126198
PCT Pub. Date: Jun. 23, 2022

(65) Prior Publication Data

US 2024/0053136 A1 Feb. 15, 2024

(30) Foreign Application Priority Data

Dec. 18, 2020 (AU) ................................ 2020904721

(51) Int. Cl.
*G01B 9/02061* (2022.01)
*G01B 9/02* (2022.01)

(52) U.S. Cl.
CPC ..... *G01B 9/02061* (2013.01); *G01B 9/02084* (2013.01)

(58) Field of Classification Search
CPC ............ G01B 9/02061; G01B 9/02084; G01B 9/02027; G01J 3/027; G01J 3/0297;
(Continued)

(56) References Cited

U.S. PATENT DOCUMENTS 5,675,513 A 10/1997 Hammer
2003/0223077 A1 12/2003 Hill
(Continued)

FOREIGN PATENT DOCUMENTS

WO 2004074767 9/2004

OTHER PUBLICATIONS

Kevin Bowman, "Instrument line-shape modeling and correction for off-axis detectors in Fourier-transform spectrometry", Jul. 20, 2000, Applied Optics, vol. 39 No. 21 (Year: 2000).*
(Continued)

*Primary Examiner* — Yossef Korang-Beheshti
(74) *Attorney, Agent, or Firm* — Smith Keane LLP

(57) ABSTRACT

The present invention relates to a method of reducing phase-error signal degradation in a characteristic spectrum produced by a Fourier Transform interferometer, comprising the steps of: (1) Receiving, upon the detector array, a light beam comprised of a plurality of light channels, each of the light channels being received at a corresponding location upon the detector array; (II) Producing, for each corresponding location, a Raw Location-Specific Signal (LSS) from the received light channels; (III) for each Raw LSS, calculating an Off-Axis Path Difference (OxPaDE) scaling function dependent upon a distance and direction of the corresponding location from a target location; (IV) coordinate-transforming each Raw LSS using their corresponding calculated OxPaDE function to produce an Adjusted LSS; (V) averaging each Adjusted LSS to produce a Combined Signal; and (VI) inverse Fourier-Transforming the Combined Signal to produce the characteristic spectrum of the received light beam as a function of wavenumber.

13 Claims, 2 Drawing Sheets

(58) Field of Classification Search
CPC .. G01J 3/2803; G01J 3/45; G01J 3/453; G01J 9/02; G01J 2009/0238
See application file for complete search history.

(56) References Cited

U.S. PATENT DOCUMENTS

| | | | | |
|---|---|---|---|---|
| 2006/0187464 | A1 | 8/2006 | Womack et al. | |
| 2013/0222790 | A1 | 8/2013 | Hirao | |
| 2019/0170576 | A1* | 6/2019 | Guerineau | G01J 3/0297 |
| 2020/0191650 | A1* | 6/2020 | Sobol | G01J 3/4531 |

OTHER PUBLICATIONS

International Search Report and Written Opinion for International Application No. PCT/AU2021/051513, dated Mar. 17, 2022, 13 pages.

Wang, X., et al., "Analysis of mirror-tilting and sampling errors in Fourier Transform spectrometry and design of error analysis Graphical user interface," 2011 International Conference on Electronic & Mechanical Engineering and Information Technology, Harbin, China, Aug. 12-14, 2011, pp. 3186-3189.

Porter, C., et al., "Correction of phase errors in Fourier spectroscopy," International Journal of Infrared and Millimeter Waves, vol. 4, No. 2, 1983, pp. 273-298.

Bowman, et al., "Instrument line-shape modeling and correction for off-axis detectors in Fourier-transform spectrometry", Applied Optics, vol. 39, No. 21, Jul. 20, 2000 (Jul. 20, 2000), p. 3765, XP093212311.

Routley, et al., "High etendue Fourier transform spectroscopy by quadratic off-axis path difference error cancellation", Journal of the Optical Society of America A, vol. 37, No. 11, Oct. 14, 2020 (Oct. 14, 2020), p. 1767, XP093213332, ISSN: 1084-7529, DOI: 10.1364/JOSAA.396748.

* cited by examiner

METHOD OF PROCESSING INTERFEROMETRY SIGNAL, AND ASSOCIATED INTERFEROMETER

PRIORITY DETAILS

The present application claims priority from AU 2020904721, filed in Australia on 18 Dec. 2020, the entirety of which is incorporated herein by reference.

TECHNICAL FIELD

The present invention relates generally to the field of interferometry, and more specifically to the field of processing interferometry signals.

BACKGROUND

High étendue light (such as light emanating from a broad source) is incoherent, in that the various waves of light are of differing frequencies, travelling in different directions, and are naturally out of phase with one another. However, it may be thought of as being comprised of a mixture of coherent collimated light "channels", wherein each of the different light channels are coherent groups of light waves having the same trajectory.

Scanning Fourier Transform (FT) interferometry functions by receiving high étendue light from a source (which may be a sample being analysed), which is passed through an optical element configured to induce a 'path difference' or 'phase difference' between two coherent waves of the light, before the light is ultimately directed onto a detector. This induced path difference causes the two coherent waves to interfere with one another to a degree based upon the amount of path difference that is induced, and the detector detects and outputs the resulting intensity of the interfering waves as a function of path difference. As the skilled person will appreciate, interference that is detectable by an interferometer detector can generally only occur between light waves of the same 'channel'.

the signal produced by a detector of an FT interferometer, prior to processing, comprises signal intensity with respect to the induced path difference and is represented by equation shown below:

$$I(L) = I_0 = \int_{\substack{All \\ Wavenumbers}} G(k)[1 + \cos(k\,L)]dk \qquad \text{Equation 1}$$

wherein $I_0$ is the idealised signal intensity function with respect to path length difference (L) and k is the spatial frequency ($2\pi/\lambda$).

However, in reality and with reference to FIG. 1, the induced path length and the actual path length traversed by a specific light channel are not necessarily identical. Depicted is a simplistic spectrometer system, comprising a light source 10 and detector array 12, with the optical axis 14 extending therebetween. In the present example, the 'induced path length' of the spectrometer is equivalent to the length of the optical axis. Also shown is a light beam comprising an on-axis light channel 16A and an off-axis light channel 26B. As depicted by on-axis light channel 26A, when the light channel is perfectly aligned to the optical axis 24 of the interferometer (and so impacts the detector array 12 at the 'target location'), the distance travelled (the actual path length) is substantially the same as the induced path length, i.e. the length of the optical axis 14. In contrast, the misalignment with the optical axis of off-axis light channel 16B means that it will travel at an angle thereto, and so will ultimately travel both a longitudinal distance (along the optical axis 13) and a lateral distance (perpendicular to the optical axis) before impacting upon a detector 12, with the actual path length being a trigonometric function thereof. Although the spectrometer depicted in FIG. 1 is two-dimensional, misalignment can occur along both the X and the Y axes. By convention, the optical axis is typically denoted as the Z axis in three-dimensional modelling.

As each channel takes a slightly different path to reach the detector (due to each channel having a different trajectory), the actual path difference that is induced within a particular channel may be different to the induced path difference, with channels that have a larger angle of deviation from the "ideal" light path having a greater discrepancy between induced and actual path difference. Because FT interferometers detect and initially process data as a function of induced path length, the difference between induced and actual path difference means that the detected signals from the range of channels impacting upon the detector sum destructively, resulting in signal degradation. For low-sensitivity, low-aperture-size or low scan-range detectors this is less of a problem, but—as the skilled person will appreciate—prior art detectors for FT interferometers require a trade-off between detector sensitivity, aperture size and scan range.

A larger aperture size allows more light to be captured simultaneously, allowing for faster and more efficient processing by capturing a wider light beam. Non-homogenous samples (E.G.: soil samples, minerals, and other agglomerate solids) also benefit from being analysed by a wider light beam since a greater proportion of the sample can be illuminated and analysed at once, allowing for a better estimate of the average composition of the non-homogenous sample. However, this also leads to light channels having a greater range in the potential angle of deviation being detected by the detector and so signal degradation becomes more prevalent, thus reducing the FT interferometer's overall sensitivity.

The scan range of an FT interferometer, being the range of path length differences that are able to be induced, also affects the level of signal degradation. It is theorised that the difference between the induced and actual path difference is proportional to the induced path difference, meaning that as induced path difference increases, the difference between induced and actual path difference will also increase.

As a result of the above, in order to improve the sensitivity of the detector, the detector aperture and/or the scan range must be smaller so as to reduce the amount of signal noise due to differences between induced and actual path difference. This substantially increases the time to scan and analyse a sample via FT interferometry, particularly when a sample is non-homogenous. As a result, this severely limits the practicality of field-deployed FT interferometers with high sensitivity, as it is generally desired that analysis of a sample "in the field" is rapid—meaning a wide detector aperture is desirable—and capable of a broad analysis, such that a large scan range is also desired.

There is therefore a need for a means of reducing, removing, inhibiting or otherwise ameliorating the effects of signal degradation due to variation induced and actual path difference. These, and other advantages, may be provided by one or more embodiments of the invention disclosed herein.

DISCLOSURE OF THE INVENTION

A first aspect of the invention may lie in a method of reducing phase-error signal degradation in a characteristic spectrum produced by a Fourier-Transform interferometer comprising a collimator and a detector array. In an embodiment, the method may comprise the steps of:

I. Receiving, upon the detector array, a light beam comprised of a plurality of light channels, each of the plurality of light channels being received at one of a plurality of corresponding locations upon the detector array;
II. Producing, for each corresponding location, a Raw Location-Specific Signal (LSS) from the received light channels;
III. for each Raw LSS, calculating an Off-Axis Path Difference (OxPaDE) scaling function dependent upon a distance and direction of the corresponding location from a target location;
IV. coordinate-transforming each Raw LSS using their corresponding calculated OxPaDE function to produce, from each Raw LSS, a coordinate-transformed LSS;
V. averaging each Coordinate-transformed LSS to produce a Combined Signal; and
VI. inverse Fourier-Transforming the Combined Signal to produce the characteristic spectrum of the received light beam as a function of wavenumber;

wherein the target location is a corresponding location on the detector array at which phase-error noise is substantially zero.

In an embodiment, each Raw LSS may be a signal intensity function comprising a set of received signal intensity values and corresponding set of induced path length values, and Step IV comprises, for each Raw LSS, the sub-steps of:

4A) applying the OxPaDE Scaling Function to determine an actual path length value for each induced path length value within the set of induced path length values, such that each received signal intensity value subsequently corresponds to an actual path length value;
4B) coordinate-transforming the set of received intensity values, at each induced path length value, to determine a set of coordinate-transformed signal intensity values; and
4C) generating the Coordinate-transformed LSS as a signal intensity function comprising the set of coordinate-transformed signal intensity values and corresponding set of induced path length values.

In an embodiment, the OxPaDE Scaling Function may be linearly proportional to induced path length.

In an embodiment, the OxPaDE Scaling Function may be a function of an angle of deviation ($\theta$), being an angle between the received light channel and an optical axis extending through the target location, and a particular corresponding location, having a particular distance and particular direction from the target location, receives light channels having a particular $\theta$ substantially according to each of the particular distance and the particular direction.

In an embodiment, the detector array may comprise a plurality of detector pixels, each detector pixel being positioned at a separate one of the plurality of corresponding locations, and the Raw and Coordinate-transformed Location-Specific Signals are Raw and Coordinate-transformed Single-Pixel Signals, respectively.

In an embodiment, each detector pixel may comprise a first pixel edge and a second pixel edge spaced apart by a width, and the width is such that a change in $\theta$ of a signal incident thereupon proximate the first edge, compared to being incident thereupon proximate the second edge, and therefore a change in the OxPaDE Scaling Function, is negligible. In an embodiment, negligible change in the OxPaDE Scaling Function ultimately corresponds to a change in the characteristic spectrum that is lower than a spectral resolution of the detector pixel array.

In an embodiment, each Raw LSS is a received signal intensity function, being received signal intensity as a function of an induced path length variable (L) and Step IV comprises, for each Raw LSS, the sub-step of modifying the received signal intensity function to be received signal intensity as a function of the induced path length variable plus OxPaDE.

A second aspect of the invention may lie in a Fourier-transform spectrometer comprising a detector array arranged to receive a light beam comprised of a plurality of light channels, each location producing a Raw Location-Specific Signal (LSS) from the received light channels, a coordinate-transformation means for coordinate-transforming each Raw LSS according to the corresponding location's position within the array, the coordinate-transformation means producing a coordinate-transformed LSS from each Raw LSS, an averaging means for determining a Combined Signal from the Coordinate-transformed LSS, and an inversion means for inverse Fourier-transforming the Combined Signal in order to produce a characteristic spectrum of the received light beam as a function of wavenumber.

A third aspect of the invention may lie in a processor configured to receive a Raw Location-Specific Signal (LSS) as an input from at least one corresponding location within a detector array and enact the following algorithm:

A. determine location information for the at least one corresponding location;
B. calculate an Off-Axis Path Difference (OxPaDE) scaling function using the determined location information;
C. adjust the Raw LSS, being a received signal intensity as a function of an induced path length, based upon the calculated OxPaDE scaling function; and
D. generate a coordinate-transformed LSS by coordinate-transforming the adjusted Raw LSS signal intensity function at each value of the induced path length.

Further embodiments may become apparent through the following disclosure. These and other embodiments are considered to fall within the scope of the invention as disclosed.

DESCRIPTION OF FIGURES

Embodiments of the present invention will now be described in relation to figures, wherein.

DEFINITION OF TERMS

As used herein, the term 'channel' is used to refer to the set of light waves within a light beam that have a substantially same 'angle of deviation' from the optical axis, and thus have substantially similar trajectories through an optical system such as an interferometer.

As used herein, the term 'particular' when used in reference to one of a plurality of elements should be interpreted as meaning "any one of the plurality of elements", and should not be interpreted as referring to or introducing an element that is in addition to the plurality of elements.

As used herein, the term "phase-error signal degradation" refers to, in general, degradation or destruction of a received signal due to unintended destructive interference, and more particularly to destructive interference caused by two light channels having different trajectories and/or lateral positions within a light beam inducing relative, unintentional and undesired phase-shifting therebetween.

Description of Mathematical Symbols

The following table lists out and identifies mathematical symbols used herein:

| SYMBOL | DEFINITION | SYMBOL | DEFINITION |
|---|---|---|---|
| G(k) | Characteristic Spectrum | $\gamma_x, \gamma_y$ | Direction cosines along the x/y axis |
| Π(kLX, X) | Off-axis Path length Error | k | Spatial frequency (k = 2π/λ) |
| Π(kL, $\gamma_x, \gamma_y$) | (OxPaDE) Scaling Function | | |
| f($\gamma_x, \gamma_y$) | Machine-specific approximation function of OxPaDE Scaling Function | kL | Phase Difference (Induced) |
| I(L) | A Signal Intensity Function | kL + Π(kL, $\gamma_x, \gamma_y$) | Phase Difference (Actual) |
| $I_{LSS}$(L) | A location-specific Signal Intensity Function | i | Square root of negative 1 |
| L | Path Length | $I_0$ | Idealised result for I(L) |

The Raw LSS may be generated as a function. Alternatively, the Raw LSS may be generated as a signal intensity dataset comprising a set of induced path length values and corresponding set of received signal intensity values. A signal intensity dataset corresponds to data points along the received signal intensity function I(L), and a LSS dataset corresponds to data points along the location-specific signal intensity function $I_{LSS}$(L). Reference herein to a signal intensity function or location-specific signal intensity function should be considered to be analogous to reference to a signal intensity dataset or location-specific signal intensity dataset, and vice-versa.

In an embodiment, each of the plurality of light channels are received at one of a plurality of corresponding locations upon the detector array. Each corresponding location has a given position within the detector array, with a particular distance and direction from a target location. In an embodiment, the target location is a corresponding location on the detector array at which phase-error signal degradation is substantially zero.

DETAILED DESCRIPTION OF PREFERRED EMBODIMENTS

Figure 2:
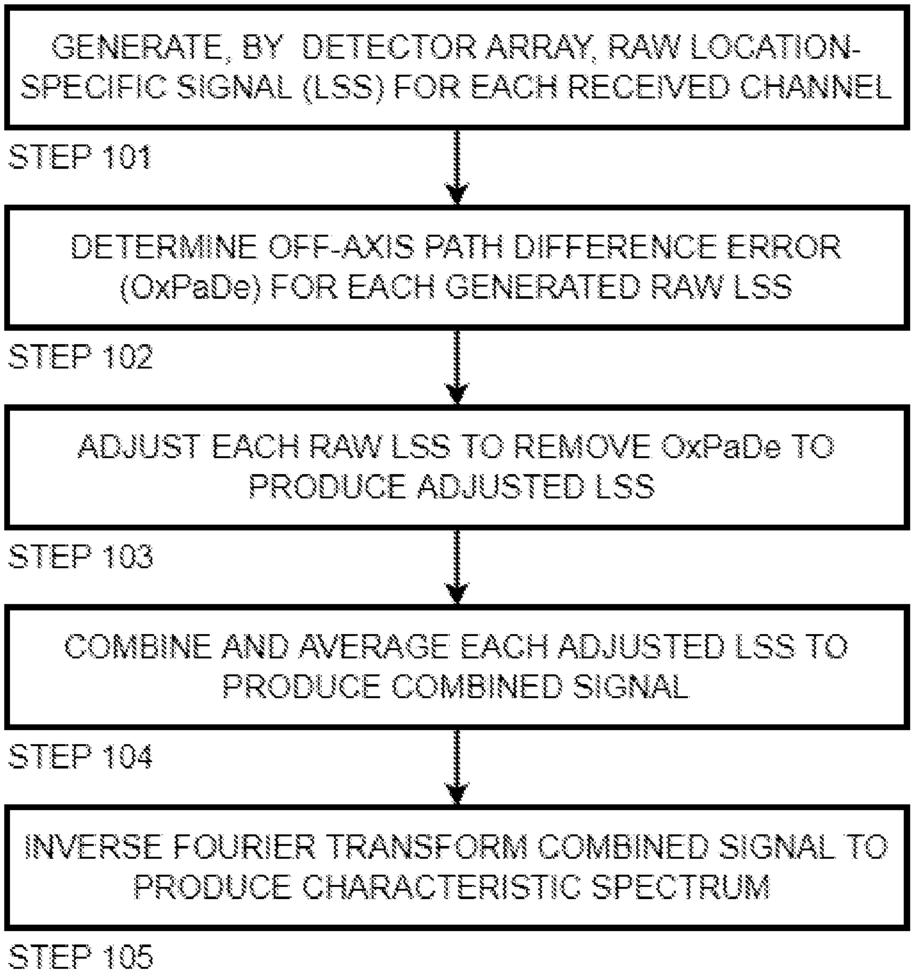
FIGS. 2 & 3 are flow diagrams depicting algorithms applied by one or more embodiments of the invention.

With reference to FIG. 2, a first aspect of the invention may reside in a method of reducing phase-error signal degradation in a characteristic spectrum produced by a Fourier-Transform interferometer comprising a collimator and a detector array, comprising the steps of:

- 101) Receiving a light beam comprised of a plurality of light channels upon the detector array and producing a Raw Location-Specific Signal (LSS) from each of the received light channels;
- 102) determining an amount of off-axis path difference error (OxPaDE) present in each Raw LSS;
- 103) adjusting each of the Raw LSS to remove the OxPaDE, producing the Adjusted LSS;
- 104) combining and averaging each of the Adjusted LSS to produce a combined signal; and
- 105) inverse Fourier-Transforming the combined signal to produce the characteristic spectrum of the light beam as a function of wavenumber.

In an embodiment, the light beam is an incoherent mixture of light, which may be considered to be theoretically separable into, or otherwise substantially equivalent to, a plurality of light channels that are all directed in approximately the same direction. The skilled person will appreciate that the light beam is not necessarily produced by a plurality of single-channel light sources, but rather, for the purpose of describing the invention, it may be useful to consider the light beam as being composed of a plurality of light channels.

In an embodiment, step 101 comprises use of a detector array to separately detecting each of the plurality of light channels and producing or generating a Raw Location-Specific Signal (LSS) for each.

The Raw LSS is the 'local' signal intensity function $I_{LSS}$(L) generated by a light channel, being the intensity of the generated signal as a function of induced path length L.

Off-Axis Path Difference Error

In an embodiment, step 102 may involve calculating an OxPaDE scaling function for a particular light channel.

Figure 1:
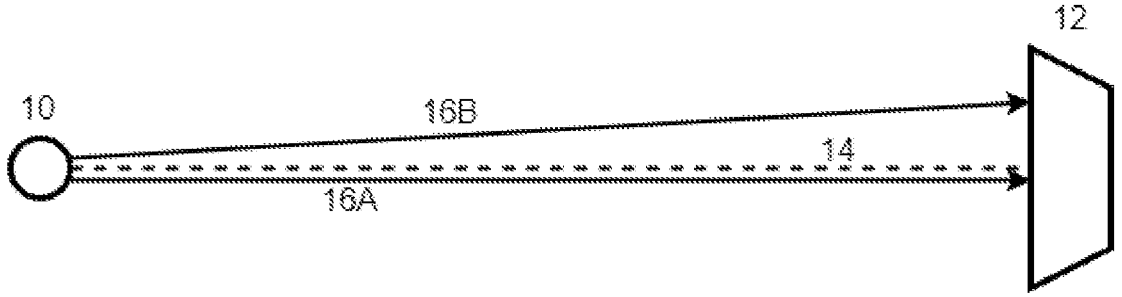
FIG. 1 is a simplified depiction of a conventional spectrometer to illustrate Off-Axis Path Difference Error.

With reference to Equation 1 and FIG. 1, $I_0$ is the 'idealised' signal intensity function as a function of the induced path length (L)—but not every light channel travels the same length. This difference between induced and actual path length results in signal error being present in the signal generated by a particular light channel, this being the Off-Axis Path Difference Error (OxPaDE). The amount of OxPaDE present in the signal intensity function is itself a function of the direction and amount of deviation of a light channel from the optical axis. Without limiting the scope of the invention by theory, any freespace spectrometer, whether a scanning FT interferometer or a grating-grounded instrument, ultimately does not measure the wavenumber, but rather a component $k_z$=<k,z> of the spatial wavevector k in the optical axis direction (typically denoted by convention as the z axis). As a result of this, there is a resulting 'error factor' (Δk), which generally follows the below equation, with the 'small-angle approximation' applied thereto:

$$\Delta k = k(1-\cos\theta) \approx \frac{k}{2}\theta^2 \; (\text{for } 0 \le |\theta| \le \sim 0.5 \text{ rad}) \qquad \text{Equation 2}$$

In a further embodiment, the OxPaDE scaling function may be calculated as a function of the light channel's angle of deviation (θ) from the optical axis. From Equation 2, if the induced path length is L (and so is the path length for a light channel aligned to the optical axis), then the optical path between them for a light channel deviating by an angle θ is L cos(θ). Therefore, for a nominal path length L, the OxPaDE scaling function π(θ) of a Raw LSS generated by a light channel having a given angle of deviation θ is given by the following equation:

$$\Pi(\theta) = L - L\cos(\theta) \approx \frac{L}{2}\theta^2 \quad \text{Equation 3}$$

where the OxPaDE scaling function describes the difference between the actual and induced path length of the light channel in question.

In a further embodiment, the Raw LSS corresponding to a light channel having an angle of deviation (θ) is shown below in Equation 4:

$$I_{LSS}(L, \theta) = \frac{I_0}{2} - \int_{\substack{All \\ Wavenumbers}} G(k)\cos(kL + \Pi(\theta))dk \quad \text{Equation 4}$$

Wherein π(θ) is the OxPaDE scaling function, being a measure of the difference between induced path length difference and actual path length difference as a function of the angle of deviation (θ) of a particular light channel.

Asymmetrical Off-Axis Path Difference Error

The Raw LSS provided by Equation 4 holds true for situations where the OxPaDE scaling function is an axisymmetric function of the angle of deviation θ, but this does not always apply. Spectrometers are three-dimensional objects and the angular deviation can extend along either axis perpendicular to the optical axis, which will be referred to hereafter as the x and y axes.

In an embodiment, the angle of deviation θ of a particular light channel may have both a "horizontal" (or x-axis) component and a "vertical" or (y-axis) component. In such an embodiment, each separate light channel will have its own 'corresponding location', that being a point or region of the detector array that a particular light channel will impact upon, based upon its characteristics, the spectrometer design and the experimental setup being utilised. A particular corresponding location may be represented as coordinates (X,Y), wherein coordinates (0,0) correspond to the 'target location'—that being the point of intersection of the detector array with the optical axis. 'X' and 'Y' can be considered to be equivalent to distances of the corresponding location from (0,0) along the x- and y-axis respectively, and so are equivalent to the lengths of the x-axis and y-axis deviation of the particular light channel as it travels from the source to the detector array. As the skilled person will appreciate, the lengths of the x-axis and y-axis deviation of the particular light channel, X and Y, are proportional to the induced path length L and the angle of deviation θ.

Step 101 may comprise the generation of the Raw LSS for each particular corresponding location in the detector array, with the generated Raw LSS being stored, marked, flagged, named or otherwise sorted such that the corresponding location that generated it is known or recorded, along with the coordinates (X,Y) associated therewith. In a further embodiment, a Raw LSS intensity function for a particular light channel received at a corresponding location having coordinates (X,Y) may be represented:

$$I_{LSS}(L, X, Y) = \frac{I_0}{2} - \int_{\substack{All \\ Wavenumbers}} G(k)\cos(kL + \Pi(X, Y))dk \quad \text{Equation 5}$$

Wherein π(X,Y) is the OxPaDE scaling function as a function of the distance and direction of the particular corresponding location at (X,Y) from the target location, which has coordinates (0,0).

In a further embodiment, the OxPaDE scaling function may be linearly proportional to induced path length difference. As the induced path length difference increases, the light channel will travel a proportionally greater distance. As a result, in a further embodiment, Equation 5 may become:

$$I_{LSS}(L, X, Y) = \frac{I_0}{2} - \int_{\substack{All \\ Wavenumbers}} G(k)\cos(kL + \Pi(kL, X, Y))dk \quad \text{Equation 6}$$

The Raw LSS intensity function $I_{LSS}$(L,X,Y) is a real and even function of kL, while the OxPaDE is an odd function of kL. On extending the spectrum G(k) to negative wavenumbers so that it is an even function of k, Equation 6 may be modified as follows:

$$I_{LSS}(L, X, Y) = \frac{I_0}{2} - \int_{-\infty}^{\infty} G(k)\exp(i(kL + \Pi(kL, X, Y)))dk = \frac{I_0}{2} - \frac{1}{2}\int_{-\infty}^{\infty} G(k)\cos(kL + \Pi(kL, X, Y))dk \quad \text{Equation 7}$$

In one further embodiment, the OxPaDE function may be considered to have an approximately proportional relationship with the induced path length difference. In a further embodiment wherein the interferometer is a "freespace interferometer" such as a Michelson interferometer, the relationship may be exactly proportional. As the skilled person will appreciate, slight deviations from proportionality may arise in the case of tilting glass interferometers, where the interferometer's path difference is modulated by a material with dispersion properties (refractive index dependent on wavelength). As the skilled person may appreciate Equation 7 may, in at least one embodiment, be modified to include an adjustment factor to account for deviations from proportionality by particular FT interferometer types, however it will not be included in further equations for clarity purposes. These adjustment factors are typically device-specific, and are either known or routinely-derivable factors.

Although the previous equations describe the corresponding location having coordinates (X,Y) utilising the Cartesian coordinate system, as noted throughout this document a particular corresponding location comprises a particular distance and particular direction from the target location. Therefore in an alternative embodiment of the invention, the corresponding location may be described via the polar coordinate system as (r,φ), being the distance (r) and direction (φ) of the corresponding location from the target location. Although the equations throughout this document are typically described in terms of the Cartesian coordinate system, the skilled person will appreciate that the equations can be routinely modified using the following relations:

$$X = r\cos(\varphi),\ Y = r\sin(\varphi) \quad \text{Equation 8}$$

The skilled person will further appreciate that use of the polar coordinate system instead of the Cartesian coordinate system does not depart from the scope of the invention.

Without limiting the scope of the invention by theory, distance and direction of a particular corresponding location from the 'target location' (0,0) may differ between FT interferometer models. As such, it may be beneficial to provide a unified form of the Raw LSS signal intensity function. The distances of deviation X and Y, which are proportional to both the induced path length L and the angle of deviation θ, may be may be expressed solely as a function of the angle of deviation θ of the light channel incident upon said particular corresponding location. The resulting variables are $\gamma_x$ and $\gamma_y$, which are the x- and y-axis direction cosines of the angle of deviation θ, and the resulting OxPaDE scaling function can be determined as a function of these direction cosines. In an embodiment, a particular corresponding location having coordinates (X,Y) will have corresponding direction cosines ($\gamma_x$,$\gamma_y$). In such an embodiment, Equation 7 may be rewritten as follows:

$$I_{LSS}(L, \gamma_x, \gamma_y) = \frac{I_0}{2} - \frac{1}{2}\int_{-\infty}^{\infty} G(k)\cos(kL + \Pi(kL, \gamma_x, \gamma_y))dk \quad \text{Equation 9}$$

In a further embodiment wherein the light beam is an extended, high étendue source, Equation 10 becomes a superposition over $\gamma_x$ and $\gamma_y$. This superposition of sinusoids leads to fading. In such an embodiment, the OxPaDE scaling function may be able to be derived. As noted previously, there is an approximately proportional relationship between the OxPaDE scaling function $\pi(kL,\gamma_x,\gamma_y)$ and the path difference L. As a result, the OxPaDE scaling function may be approximated as follows:

$$\Pi(k, L, \gamma_x, \gamma_y) \approx kL(f(\gamma_x, \gamma_y)) \quad \text{Equation 10}$$

wherein $f(\gamma_x,\gamma_y)$ is a system-specific function scaled by kL, and can be derived through standard experimental calibration processes.

An exemplary form of the OxPaDE scaling function as applicable to a freespace Michelson FT interferometer is shown below, however the skilled person will appreciate that other forms of $f(\gamma_x,\gamma_y)$ lie within the scope of the invention disclosed herein:

$$\Pi(L, \gamma_x, \gamma_y) = \frac{kL}{2}(\gamma_x^2 + \gamma_y^2) = \frac{kL}{2}\sin^2\theta \quad \text{Equation 11}$$

In some embodiments, when $|\theta_{max}|$ is such that $\sin(\theta_{max})\approx\theta_{max}$ (the sineform of the small-angle approximation, which holds for the approximate range of 0 rad to ±0.5 rad), the OxPaDE Scaling Function may be further approximated by the following Equation:

$$\sqrt{\gamma_x^2 + \gamma_y^2} = \sin\theta \approx \theta \ (\text{for } 0 \le |\theta| \le \sim 0.5 \text{ rad}) \quad \text{Equation 12}$$

$$\Pi(L_i, \gamma_x, \gamma_y) = \frac{L_i}{2}\sin^2\theta \approx \frac{L_i}{2}\theta^2 \ (\text{for } 0 \le |\theta| \le \sim 0.5 \text{ rad})$$

In an embodiment, the step of calculating the OxPaDE scaling function may comprise utilising Equation 11. In a further embodiment, the step of calculating the OxPaDE scaling function may comprise utilising Equation 12. In a further embodiment, the step of calculating the OxPaDE scaling function may comprise utilising Equation 13.

Adjusting the Raw LSS Intensity Function

As the skilled person may appreciate, the overall system intensity function that is used to generate the characteristic spectrum may be a combination of all of the LSS intensity functions. As such, each Raw LSS may require adjustment so that their functions are aligned with one another, thereby enabling them to be combined. In an embodiment, adjusting each of the Raw LSS to remove the OxPaDE may comprise remapping the Raw LSS function $I_{LSS}(L,X,Y)$ to be $I_{LSS}(L+\pi(X,Y),X,Y)$, based upon the following equation:

$$L_{act} = L_i + \Pi(X, Y) \quad \text{Equation 13}$$

wherein $L_i$ & $L_{act}$ are an induced/actual path length difference in units of length. In a further embodiment, the Raw LSS function may be a function of x- and y-axis direction cosines $\gamma_x$ and $\gamma_y$. In further embodiments, the OxPaDE scaling function may additionally be a function of induced path length $L_i$. In such an embodiment, Equation 14 may become:

$$L_{act} = L_i + \Pi(L_i, \gamma_x, \gamma_y) \quad \text{Equation 14}$$

In one embodiment, the Raw LSS may be a received signal intensity function, being received signal intensity as a function of an induced path length variable ($L_i$). In such an embodiment, the step of adjusting the Raw LSS may comprise modifying the received signal intensity function to be received signal intensity as a function of the induced path length variable plus OxPaDE.

Figure 3:
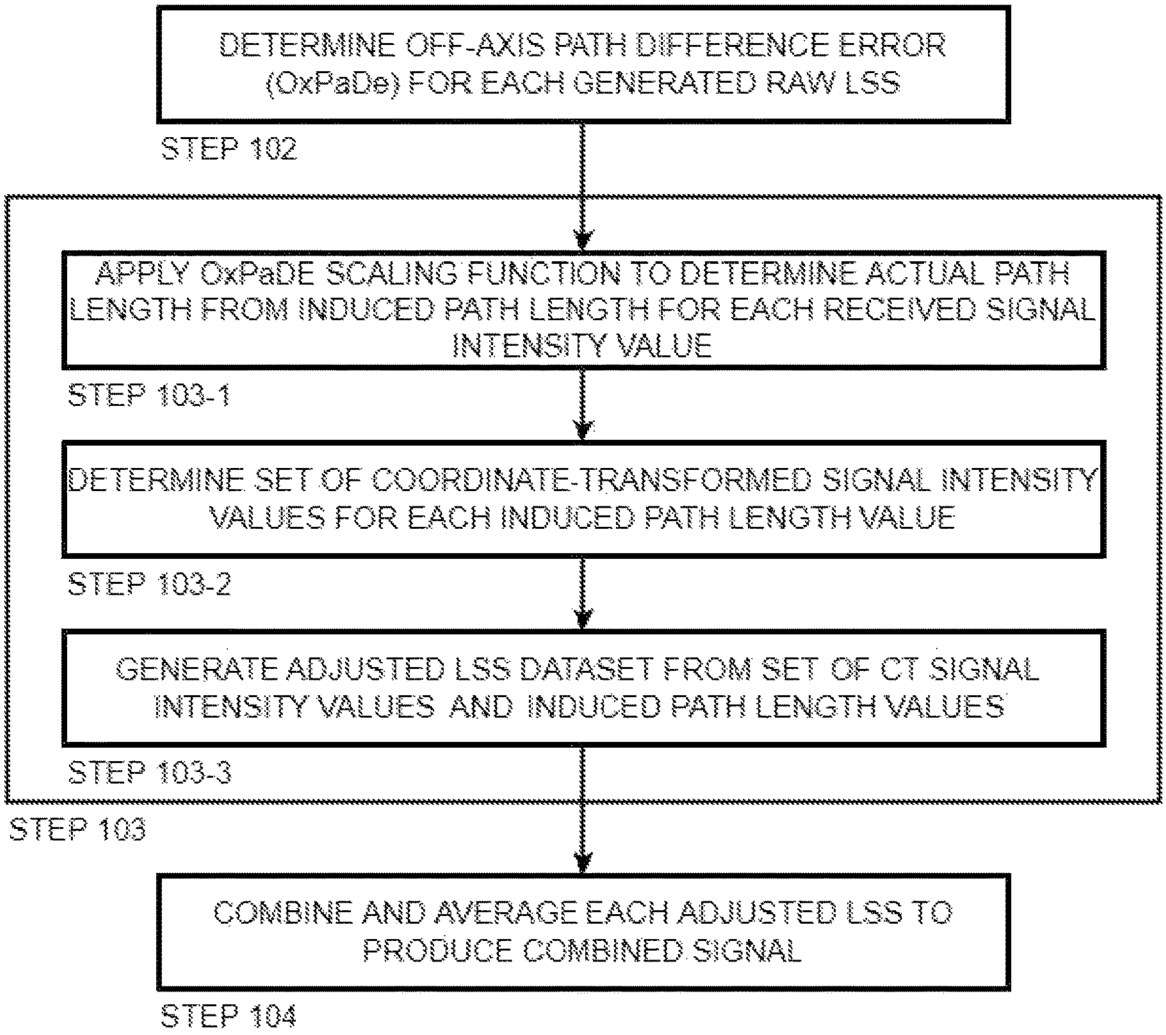

In such an embodiment and with reference to FIG. 3, Step 103—being the step of adjusting the Raw LSS—may comprise the following steps:

- 103-1. applying the OxPaDE Scaling Function to determine an actual path length value for each induced path length value within the set of induced path length values and associating each received signal intensity value with their respective actual path length value;
- 103-2. coordinate-transforming the set of received intensity values to determine a set of coordinate-transformed signal intensity values for each induced path length value; and
- 103-3. generating the Coordinate-transformed LSS as a signal intensity function or dataset comprising the set of induced path length values and corresponding set of coordinate-transformed signal intensity values.

As the skilled person may appreciate, step 103-1 comprises rescaling and/or shifting the set of received signal intensity values (or shifting the function I(L)), so that each received signal intensity value is matched to its corresponding actual path length value, forming a 'shifted signal intensity function'. In other words, the function is modified so that each signal intensity value within the LSS function $I_{LSS}(L)$ is now associated with the path length that actually resulted in the particular signal intensity value, rather than left assigned to the nominal 'induced path length' which only represents reality for light channels that are perfectly aligned to the optical axis. The shifted function may now be considered to provide a 'true' picture of the shape of the Raw LSS intensity function.

Step 103-2 comprises coordinate-transformation of the received signal intensity values within the shifted function, in order to determine a signal intensity value would be measured had the corresponding location of the detector array been positioned such that the induced and actual path length values were equal.

Step 103-3 comprises forming an Adjusted LSS from the set of induced path length values and the set of coordinate-transformed signal intensity values generated in Step 103-2.

As the skilled person may appreciate, coordinate-transformation of the function and subsequent generation of the Adjusted LSS is a crucial step in removing, ameliorating or otherwise substantially negating the OxPaDE and ultimately producing a signal intensity function I(L) that is meaningful. I(L) is a function that describes the intensity of the generated signal, at a given induced path length value, across the entire detector array. Simplistically, the function I(L) may be considered as the sum of all location-specific functions $I_{LSS}(L)$ and therefore, to determine signal intensity at a particular path length (L=A), each location-specific function must be manipulated to comprise a value for $I_{LSS}(A)$.

Finally, step 104 comprises combining the various Adjusted LSS into a final Combined Signal. There are various methods known in the art to combine signals received from detector arrays and the skilled person will appreciate that the most appropriate method to apply will depend upon the exact nature of the interferometry experiment being conducted.

The Combined Signal corresponds to, or otherwise may be considered equivalent to the signal intensity function I(L) with OxPaDE algorithmically removed, reduced, nullified or at least ameliorated, which may then be inverse Fourier-Transformed using any of the conventional and appropriate methods known in the art in order to produce the characteristic spectrum of the received light beam as a function of wavenumber.

The Detector Array

In one embodiment, the detector array may comprise a detector surface capable of location-specific intensity detection. Each particular location upon the detector surface may generate a separate LSS based upon the received light channels incident thereupon.

In a further embodiment, the detector array may be divided into an array of detector pixels, each pixel being a single detector with a known location within the array. In such an embodiment, each detector pixel may be positioned at a separate one of the plurality of corresponding locations, and the Raw and Coordinate-transformed Location-Specific Signals may be Raw and Coordinate-transformed Single-Pixel Signals, respectively.

In an embodiment, each detector pixel may comprise a first pixel edge and a second pixel edge spaced apart by a width. In such an embodiment, the width may be such that a change in π(X,Y) from the first pixel edge to the second pixel edge is negligible. In a further embodiment, negligible change in the OxPaDE Scaling Function may ultimately correspond to a change in the characteristic spectrum that is either lower than a spectral resolution of the detector pixel array, or is either low enough to be acceptable for the particular application of the spectrometer.

Further Embodiments

In an embodiment of the present invention an exemplary method of reducing phase-error signal degradation in the characteristic spectrum may comprise the steps of:

1) Receiving, upon the detector array, a light beam comprised of a plurality of light channels, each of the plurality of light channels being received at one of a plurality of corresponding locations upon the detector array;
2) Producing, for each corresponding location, a Raw Location-Specific Signal (LSS) from the received light channels;
3) for each Raw LSS, calculating an Off-Axis Path Difference (OxPaDE) scaling function dependent upon a distance and direction of the corresponding location from a target location;
4) coordinate-transforming each Raw LSS using their corresponding calculated OxPaDE function to produce, from each Raw LSS, an Adjusted LSS;
5) averaging together each Adjusted LSS to produce a Combined Signal; and
6) inverse Fourier-Transforming the Combined Signal to produce the characteristic spectrum of the received light beam as a function of wavenumber.

The above method is considered to be particularly efficient computationally. In an alternate embodiment of the present invention, a potentially more computationally-intensive method of reducing phase-error signal degradation in the characteristic spectrum may instead comprise the steps of:

201) Receiving, upon the detector array, a light beam comprised of a plurality of light channels, each of the plurality of light channels being received at one of a plurality of corresponding locations upon the detector array;

202) Producing, for each corresponding location, a Raw Location-Specific Signal (LSS) from the received light channels;

203) for each Raw LSS, calculating an Off-Axis Path Difference (OxPaDE) scaling function dependent upon a distance and direction of the corresponding location from a target location;

204) coordinate-transforming each Raw LSS using their corresponding calculated OxPaDE function to produce, from each Raw LSS, an Adjusted LSS;

205) inverse Fourier-Transforming each Adjusted LSS to produce a Location-Specific Characteristic Spectrum; and

206) averaging together each Location-Specific Characteristic Spectrum to produce the characteristic spectrum of the received light beam as a function of wavenumber.

The above embodiment of the method is considered to be more computationally intensive as each separate Adjusted LSS undergoes an inverse Fourier Transform, rather than conducting a single inverse Fourier-Transformation as a final step. However, there may be situations wherein such a method is considered more appropriate. Therefore, the skilled person will appreciate that merely swapping steps 5 & 6 of the method disclosed above does not constitute a real, practical departure from the present invention.

Further Aspects of the Invention

A second aspect of the invention may lie in a Fourier-transform spectrometer comprising a detector array arranged to receive a light beam comprised of a plurality of light channels, each location upon the detector array producing a Raw Location-Specific Signal (LSS) from the received light channels, a coordinate-transformation means for coordinate-transforming each Raw LSS according to the corresponding location's position within the array, the coordinate-transformation means producing a coordinate-transformed LSS from each Raw LSS, an averaging means for determining a Combined Signal from the Coordinate-transformed LSS, and an inversion means for inverse Fourier-transforming the Combined Signal in order to produce a characteristic spectrum of the received light beam as a function of wavenumber. In an embodiment, the detector array may comprise a plurality of detector pixels and each location upon the detector array may be a detector pixel. An embodiment of the second aspect of the invention may utilise an embodiment of the method of the first aspect of the invention.

A third aspect of the invention may lie in a processor configured to receive a Raw Location-Specific Signal (LSS) as an input from at least one corresponding location within a detector array and enact the following algorithm:

301. determine location information for the at least one corresponding location for the received Raw LSS;

302. calculate an Off-Axis Path Difference (OxPaDE) scaling function using the determined location information;

303. adjust the Raw LSS, being a received signal intensity as a function of an induced path length, based upon the calculated OxPaDE scaling function; and

304. generate a coordinate-transformed LSS by coordinate-transforming the adjusted Raw LSS signal intensity function at each value of the induced path length.

An embodiment of the third aspect of the invention may utilise an embodiment of the method of the first aspect of the invention for one or more of steps 301-304. An embodiment of the third aspect of the invention may be incorporated into, or otherwise connected to and/or in communication with, a Fourier-transform spectrometer comprising a detector array substantially in line with an embodiment of the second aspect of the invention.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. A method of reducing phase-error signal degradation in a characteristic spectrum of a sample being scanned by a Fourier-Transform interferometer comprising a collimator and a detector array, the met hod comprising the steps of:

I. illuminating the sample;

II. receiving from the sample and directing through the collimator a light beam comprised of a plurality of light channels, each of the plurality of light channels having a respective angle of deviation from an optical axis of the interferometer, an induced path length corresponding to a length of the optical axis, and an actual path length that is a function of the induced path length and the respective angle of deviation;

III. Receiving the light beam upon the detector array, each of the plurality of light channels being received at one of a plurality of corresponding locations upon the detector array, wherein a particular corresponding location that receives a particular light channel is dependent upon said particular light channel's angle of deviation;

IV. Producing, by the detector array, for each corresponding location, a Raw Location-Specific Signal (LSS) from the received light channels, each Raw LSS including Off-Axis Path Difference Error (OxPaDE) that induces phase-error signal degradation, said OxPaDE being a function of induced path length, actual path length, and the respective angle of deviation of the particular light channel;

V. calculating, for each Raw LSS, an Off-Axis Path Difference Error Scaling Function (OxPaDE Scaling Function) dependent upon a distance and direction of the corresponding location from a target location, the OxPaDE Scaling Function being linearly proportional to an induced path length;

VI. coordinate-transforming each Raw LSS using its corresponding calculated OxPaDE Scaling Function to remove the OxPaDE therefrom and thereby produce, from each Raw LSS, a Coordinate-Transformed LSS;

VII. averaging together each Coordinate-Transformed LSS to produce a Combined Signal; and VIII. inverse Fourier-Transforming the Combined Signal to produce the characteristic spectrum of the sample as a function of wavenumber; wherein the characteristic spectrum of the sample enables determination of an average composition thereof; and the target location is a corresponding location on the detector array intersected by the optical axis and at which phase-error signal degradation caused by Off-Axis Path Difference Error is substantially zero.

2. The method of claim 1, wherein each Raw LSS is a signal intensity function comprising a set of received signal intensity values and corresponding set of induced path length values; and Step VI comprises, for each Raw LSS, the sub-steps of:

a. applying the OxPaDE Scaling Function to determine an actual path length value for each induced path length value within the set of induced path length values, such that each received signal intensity value subsequently corresponds to an actual path length value;

b. coordinate-transforming the set of received intensity values to determine a set of coordinate-transformed signal intensity values, which comprises a coordinate-transformed signal intensity value for each induced path length value; and c. generating the Adjusted LSS as a signal intensity function comprising the set of induced path length values and corresponding set of coordinate-transformed signal intensity values.

3. The method of claim 1, wherein:

the OxPaDE Scaling Function is a function of an angle of deviation (θ), being an angle between the received light channel and an optical axis extending through the target location;

a particular corresponding location, having a particular distance and particular direction from the target location, receives light channels having a particular θ substantially according to each of the particular distance and the particular direction.

4. The method of claim 3, wherein:

the OxPaDE Scaling Function is given by the following Equation:

$$\Pi(L_i, \gamma_x, \gamma_y) = \frac{L_i}{2}\sin^2\theta$$

and the actual path length value is given by the following equation:

$$L_{act} = L_i + \Pi(L_i, \gamma_x, \gamma_y)$$

further wherein:

θ is the angle of deviation in radians;

$L_i$ & $L_{act}$ are an induced/actual path length difference in units of length; and $\gamma_x$ and $\gamma_y$ are x-axis and y-axis direction cosines of θ, the x and y axes being perpendicular to one another and to the optical axis.

5. The method of claim 4 wherein the plurality of light channels received by the detector array satisfy the Equation $0 \leq |\theta| \leq \theta_{max}|$; and when $|\theta_{max}|$ is such that sin $\eta_{max} \approx \theta_{max}$ the OxPaDE Scaling Function is approximated by the following Equation:

$$\Pi(L_i, \gamma_x, \gamma_y) = \frac{L_i}{2}\sin^2\theta \approx \frac{L_i}{2}\theta^2.$$

6. The method of claim 1, wherein the detector array comprises a plurality of detector pixels, each detector pixel being positioned at a separate one of the plurality of corresponding locations; and the Raw and Coordinate-Transformed Location-Specific Signals are Raw and Coordinate-Transformed Single-Pixel Signals, respectively.

7. The method of claim 6, wherein:

the OxPaDE Scaling Function is a function of an angle of deviation (θ), being an angle between the received light channel and an optical axis extending through the target location;

a particular corresponding location, having a particular distance and particular direction from the target location, receives light channels having a particular θ substantially according to each of the particular distance and the particular direction;

each detector pixel comprises a first pixel edge and a second pixel edge spaced apart by a width; and the width is such that a change in θ of a signal incident thereupon proximate the first edge, compared to being incident thereupon proximate the second edge, and therefore a change in the OxPaDE Scaling Function, is negligible.

8. The method of claim 7, wherein negligible change in the OxPaDE Scaling Function ultimately corresponds to a change in the characteristic spectrum that is lower than a spectral resolution of the detector pixel array.

9. The method of claim 1, wherein each Raw LSS is a location-specific received signal intensity function, being received signal intensity as a function of an induced path length variable (L); and Step VI comprises, for each Raw LSS, the sub-step of modifying the received signal intensity function to be received signal intensity as a function of the induced path length variable plus OxPaDE.

10. The method of claim 9, wherein the sub-step of modifying the received signal intensity function comprises modifying the function to comprise the following Equation:

$$I_{LSS}(L, \theta) = \frac{I_0}{2} - \int_{\substack{All \\ Wavenumbers}} G(k)\cos(k\,L + \Pi(\theta))dk$$

further wherein:

$I_0$ is the idealised signal intensity function; and n(θ) is the OxPaDE Scaling Function as a function of the angle of deviation (θ) of a particular light channel.

11. The method of claim 10, wherein the angle of deviation is expressed as a function of x- and y-axis direction cosines, the Equation comprises:

$$I_{LSS}(L, \gamma_x, \gamma_y) = \frac{I_0}{2} - \frac{1}{2}\int_{-\infty}^{\infty} G(k)\cos(k\,L + \Pi(k\,L, \gamma_x, \gamma_y))dk.$$

12. A Fourier-transform spectrometer comprising:

a light source to illuminate a sample being scanned by the spectrometer;

a detector array arranged to receive a light beam from the sample and through a collimator, the light beam comprised of a plurality of light channels, the detector array comprising a plurality of locations and each location producing a Raw Location-Specific Signal (LSS) from the received light channels;

a coordinate-transformation means for coordinate-transforming each Raw LSS according to the corresponding location's position within the array, the coordinate-transformation means producing an Coordinate-Transformed LSS from each Raw LSS by removing Off-Axis Path Difference Error (OxPaDE) using an OxPaDE Scaling Function that is dependent upon a distance and direction of the corresponding location from a target location, the OxPaDE Scaling Function being linearly proportional to an induced path length;

an averaging means for producing a Combined Signal from the Coordinate-Transformed LSS; and an inversion means for inverse Fourier-transforming the Combined Signal in order to produce a characteristic spectrum of the sample as a function of wavenumber, wherein the characteristic spectrum of the sample enables determination of an average composition of the sample.

13. A processor configured to receive a Raw Location-Specific Signal (LSS) as an input from at least one corresponding location within a detector array within an interferometer, the detector array receiving a light beam from a sample being scanned by the interferometer and through a collimator, the light beam comprised of a plurality of light channels, the Raw LSS including Off-Axis Path Difference Error (OxPaDE) that induces phase-error signal degradation, said OxPaDE being a function of induced path length, actual path length, and the respective angle of deviation of a particular light channel received by the corresponding location and enact the following algorithm:

a. determine location information for the at least one corresponding location, the location information comprising a distance and direction of the at least one corresponding location from a target location;
b. calculate an Off-Axis Path Difference (OxPaDE) Scaling Function using the determined location information, the OxPaDE Scaling Function being linearly proportional to an induced path length;
c. coordinate-transform the Raw LSS, being a received signal intensity as a function of an induced path length, based upon the calculated OxPaDE Scaling Function to remove the OxPaDE from the Raw LSS to produce a Coordinate-Transformed LSS; and
d. average together each Coordinate-Transformed LSS to produce a Combined Signal; and
e. using the Combined Signal, producing a characteristic spectrum of the sample as a function of wave number.

* * * * *